United States Patent [19]

Numao

[11] Patent Number: 5,048,934

[45] Date of Patent: Sep. 17, 1991

[54] METHOD OF DRIVING FERROELECTRIC LIQUID CRYSTAL WITHOUT TIMING CONVERSION CIRCUITRY

[75] Inventor: Takaji Numao, Tenri, Japan

[73] Assignee: Sharp Kabushiki Kaisha, Osaka, Japan

[21] Appl. No.: 426,171

[22] Filed: Oct. 25, 1989

[30] Foreign Application Priority Data

Nov. 1, 1988 [JP] Japan ............................... 63-278139

[51] Int. Cl.[5] ......................... G02F 1/13; G09G 3/00; G09G 3/36

[52] U.S. Cl. ....................................... 359/56; 359/103

[58] Field of Search ................ 350/350 S, 339 F, 332; 340/784; 358/85

[56] References Cited

U.S. PATENT DOCUMENTS

| | | | |
|---|---|---|---|
| 4,808,991 | 2/1989 | Tachiuchi et al. | 350/332 |
| 4,878,741 | 11/1989 | Fergason | 350/339 F |
| 4,903,875 | 6/1990 | Inoue et al. | 350/350 S |
| 4,904,064 | 2/1990 | Lagerwall et al. | 350/350 S |
| 4,922,240 | 5/1990 | Duwaer | 340/784 |
| 4,925,277 | 5/1990 | Inaba | 350/350 S |
| 4,938,574 | 7/1990 | Kaneko et al. | 350/350 S |

FOREIGN PATENT DOCUMENTS

| | | | |
|---|---|---|---|
| 62-141520 | 6/1987 | Japan | 350/350 S |
| 63-11912 | 1/1988 | Japan | 350/350 S |
| 63-46078 | 2/1988 | Japan | 350/350 S |
| 1-86774 | 3/1989 | Japan | 350/350 S |

OTHER PUBLICATIONS

Japanese Technological Report Entitled "Matrix-Addressing of Ferroelectric Display Devices" to Shimizu et al., 2/3/1961, *Institute of Television Engineers of Jap.*

*Primary Examiner*—Andrew J. James
*Assistant Examiner*—Daniel N. Russell

[57] ABSTRACT

In a method of driving a ferroelectric liquid crystal display panel, a non-selection voltage B is continuously applied to a scanning electrode $L_i$ from the time at which the selection voltage A is applied to the scanning voltage $L_i$ to the time at which the selection voltage A is again applied to the scanning electrode $L_i$. Further, succeeding erasing voltage H is applied to the scanning electrode $L_i$ at the time $N \times t_0$ before the application of the selection voltage A. Thereby, approximately the same effect as realized by the application of voltage $-V_g$ for $P \times t_0$ can be provided on a pixel $A_{ij}$. This occurs irrespective of whether a bright voltage D or a dark voltage E is applied to a signal electrode $S_j$. Thus, the pixel $A_{ij}$ can be set to the dark memory state. At the time $Q \times t_0$ before the application of the succeeding erasing voltage H to the scanning electrode $L_i$, a compensation voltage G is applied. Thus, driving with no DC component left on the pixel $A_{ij}$ can be realized.

3 Claims, 13 Drawing Sheets

FIG. 1 (e) BRIGHT VOLTAGE WAVE FORM D
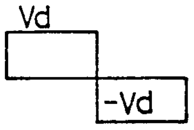
FIG. 1 (f) DARK VOLTAGE WAVE FORM E
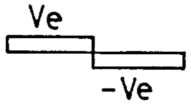
FIG. 1 (a) SELECTION VOLTAGE WAVE FORM A
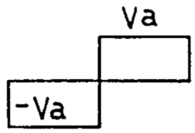
FIG. 1 (a)(1) A-D
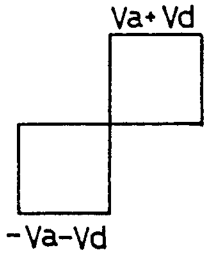
FIG. 1 (a)(2) A-E
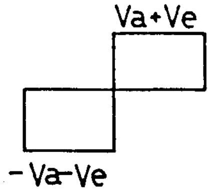
FIG. 1 (b) NON-SELECTION VOLTAGE WAVE FORM B
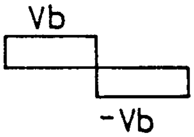
FIG. 1 (b)(1) B-D
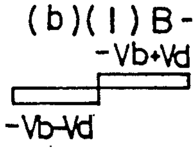
FIG. 1 (b)(2) B-E
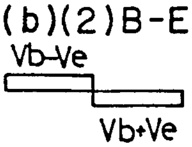
FIG. 1 (c) COMPENSATION VOLTAGE WAVE FORM G
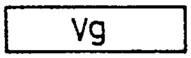
FIG. 1 (c)(1) G-D
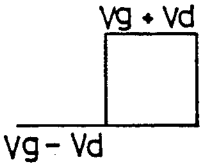
FIG. 1 (c)(2) G-E
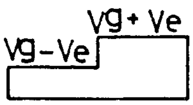
FIG. 1 (d) SUCCEEDING VOLTAGE WAVE FORM H
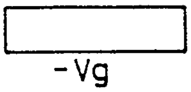
FIG. 1 (d)(1) H-D
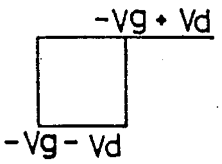
FIG. 1 (d)(2) H-E
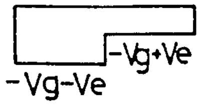

FIG. 3 (a) VOLTAGE ON SCANNING ELECTRODE L1

FIG. 3 (b) VOLTAGE ON SCANNING ELECTRODE L2

FIG. 3 (c) VOLTAGE ON SCANNING ELECTRODE L3

FIG. 3 (d) VOLTAGE ON SCANNING ELECTRODE L4

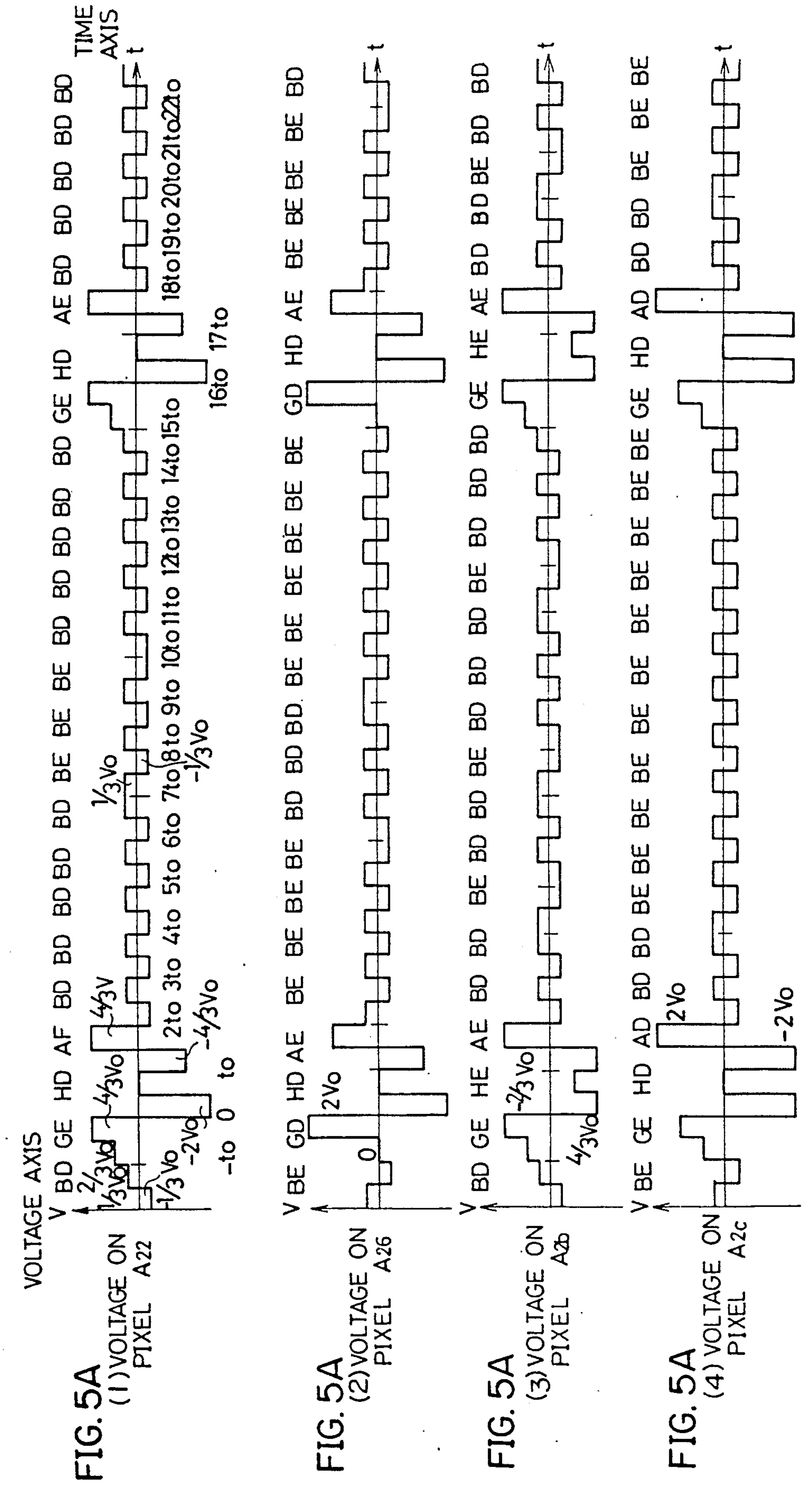
FIG. 5A (1) VOLTAGE ON PIXEL A22
FIG. 5A (2) VOLTAGE ON PIXEL A26
FIG. 5A (3) VOLTAGE ON PIXEL A2b
FIG. 5A (4) VOLTAGE ON PIXEL A2c

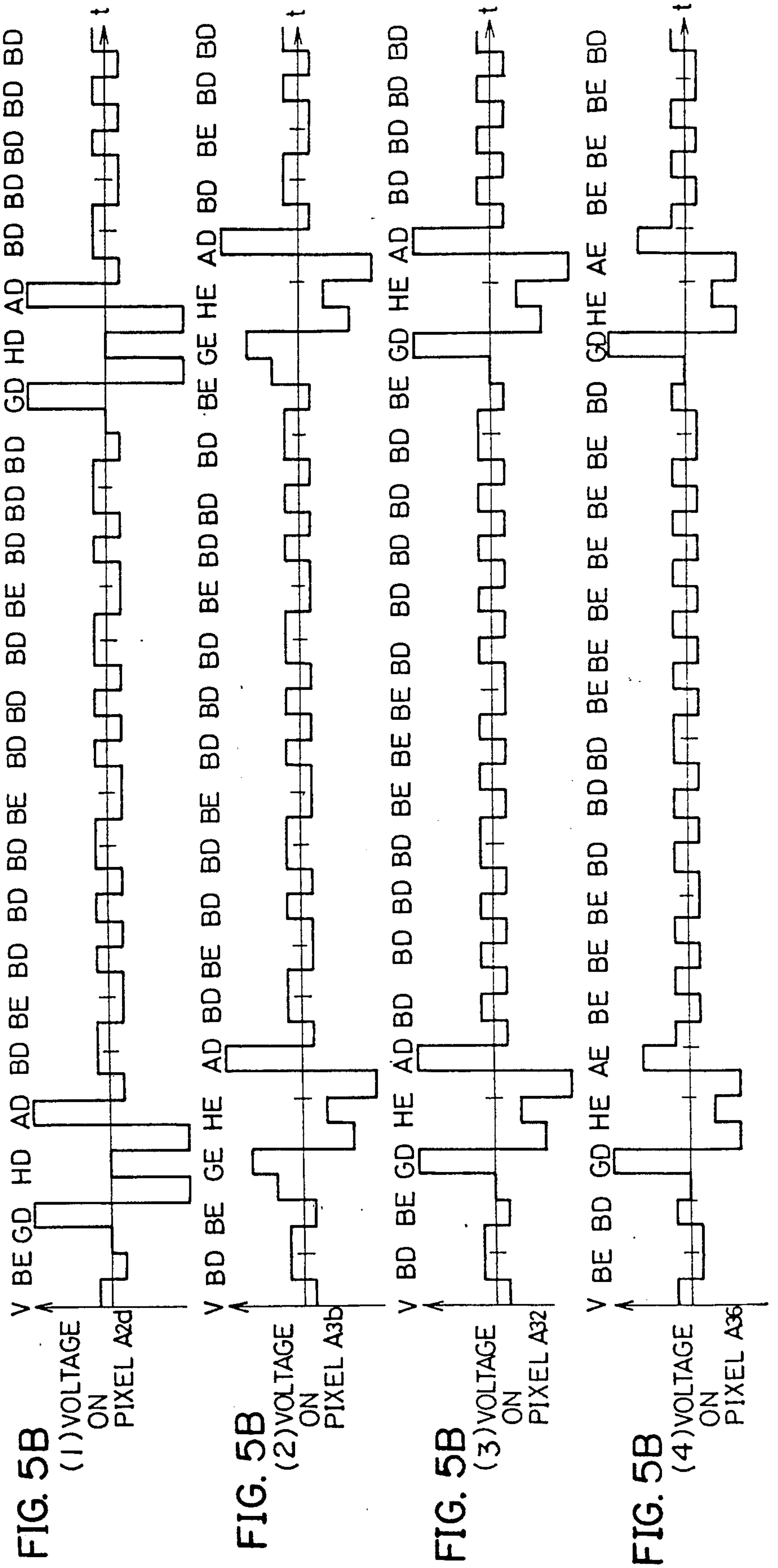
FIG. 5B (1) VOLTAGE ON PIXEL A2d
FIG. 5B (2) VOLTAGE ON PIXEL A3b
FIG. 5B (3) VOLTAGE ON PIXEL A32
FIG. 5B (4) VOLTAGE ON PIXEL A36

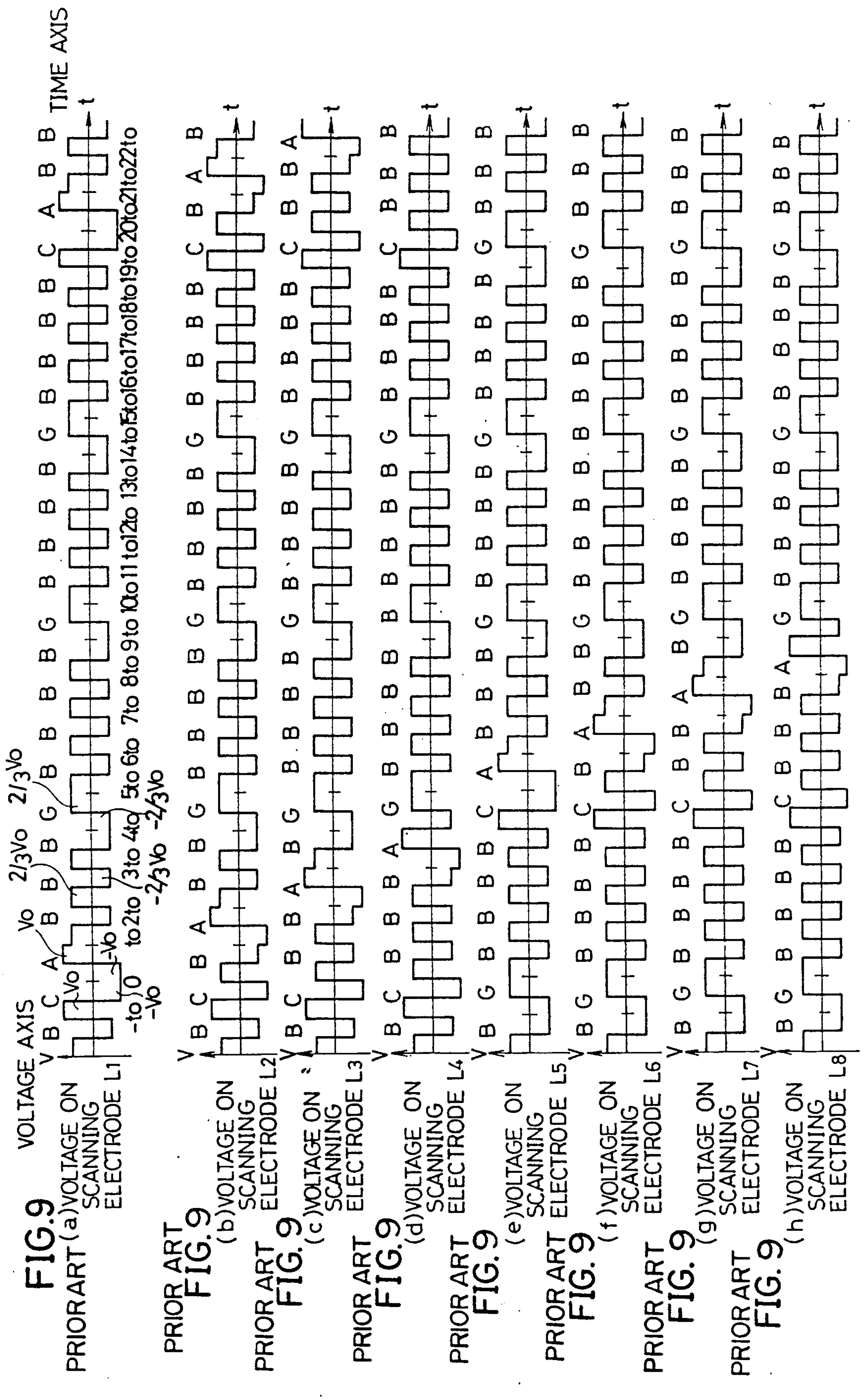
FIG.9 PRIOR ART (a) VOLTAGE ON SCANNING ELECTRODE L1
FIG.9 PRIOR ART (b) VOLTAGE ON SCANNING ELECTRODE L2
FIG.9 PRIOR ART (c) VOLTAGE ON SCANNING ELECTRODE L3
FIG.9 PRIOR ART (d) VOLTAGE ON SCANNING ELECTRODE L4
FIG.9 PRIOR ART (e) VOLTAGE ON SCANNING ELECTRODE L5
FIG.9 PRIOR ART (f) VOLTAGE ON SCANNING ELECTRODE L6
FIG.9 PRIOR ART (g) VOLTAGE ON SCANNING ELECTRODE L7
FIG.9 PRIOR ART (h) VOLTAGE ON SCANNING ELECTRODE L8
VOLTAGE AXIS
TIME AXIS
Vo
-Vo
2/3Vo
-2/3Vo PRIOR ART FIG. 10
(a) VOLTAGE ON SIGNAL ELECTRODE S2
PRIOR ART FIG. 10
(b) VOLTAGE ON SIGNAL ELECTRODE S6
PRIOR ART FIG. 10
(c) VOLTAGE ON SIGNAL ELECTRODE Sb
PRIOR ART FIG. 10
(d) VORTAGE ON SIGNAL ELECTRODE Sc
PRIOR ART FIG. 10
(e) VOLTAGE ON SIGNAL ELECTRODE Sd
VOLTAGE AXIS
V
TIME AXIS
t
1/3Vo
-5Vo
-to 0
to
2 to
3to
4to
5to
6to
7to
8to
9to
10to
11 to
12to
13to
14to
15to
16to
17to
18to
19to
20to
21to
22to

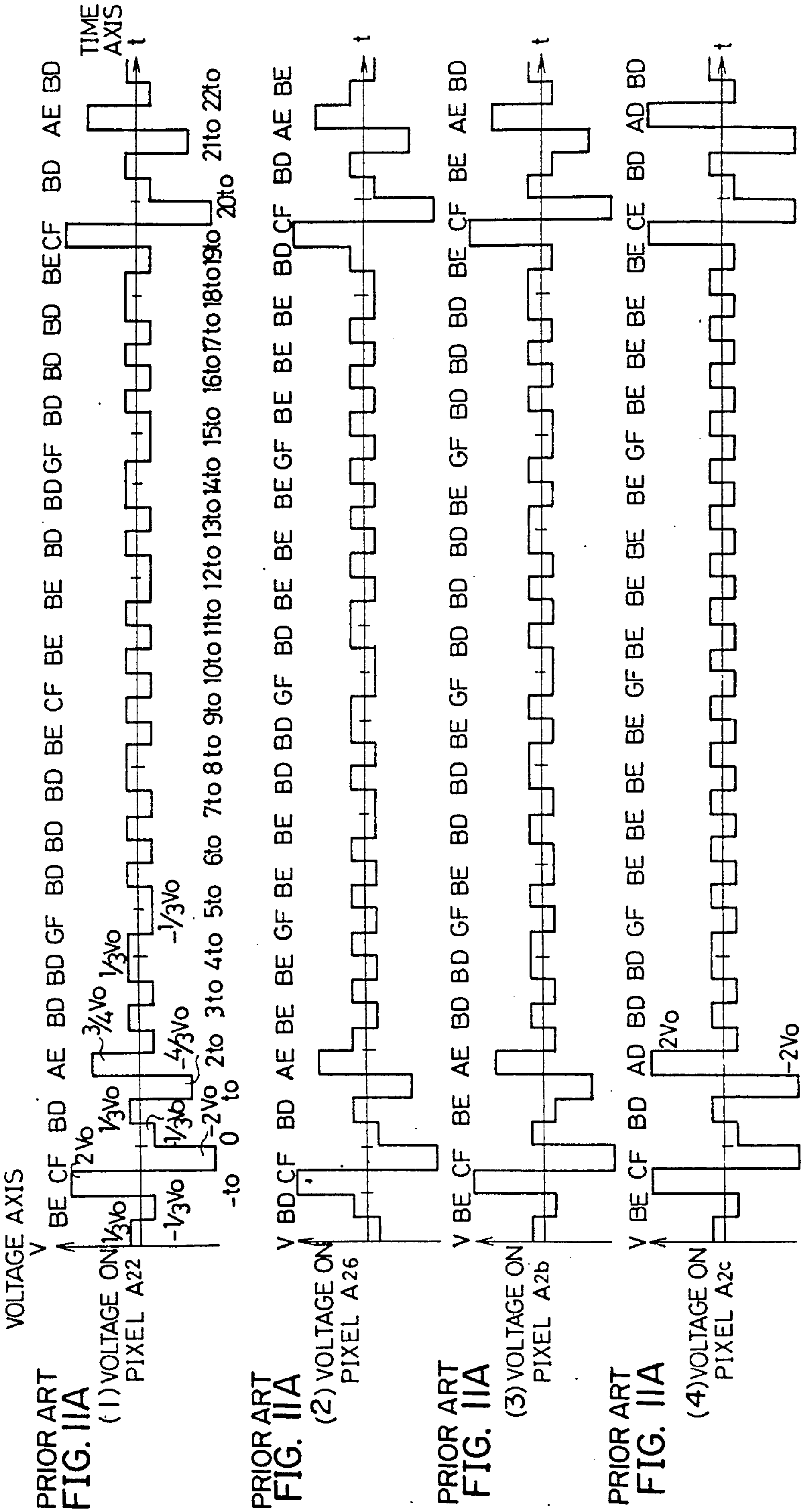
PRIOR ART FIG. 11A (1) VOLTAGE ON PIXEL A22
PRIOR ART FIG. 11A (2) VOLTAGE ON PIXEL A26
PRIOR ART FIG. 11A (3) VOLTAGE ON PIXEL A2b
PRIOR ART FIG. 11A (4) VOLTAGE ON PIXEL A2c

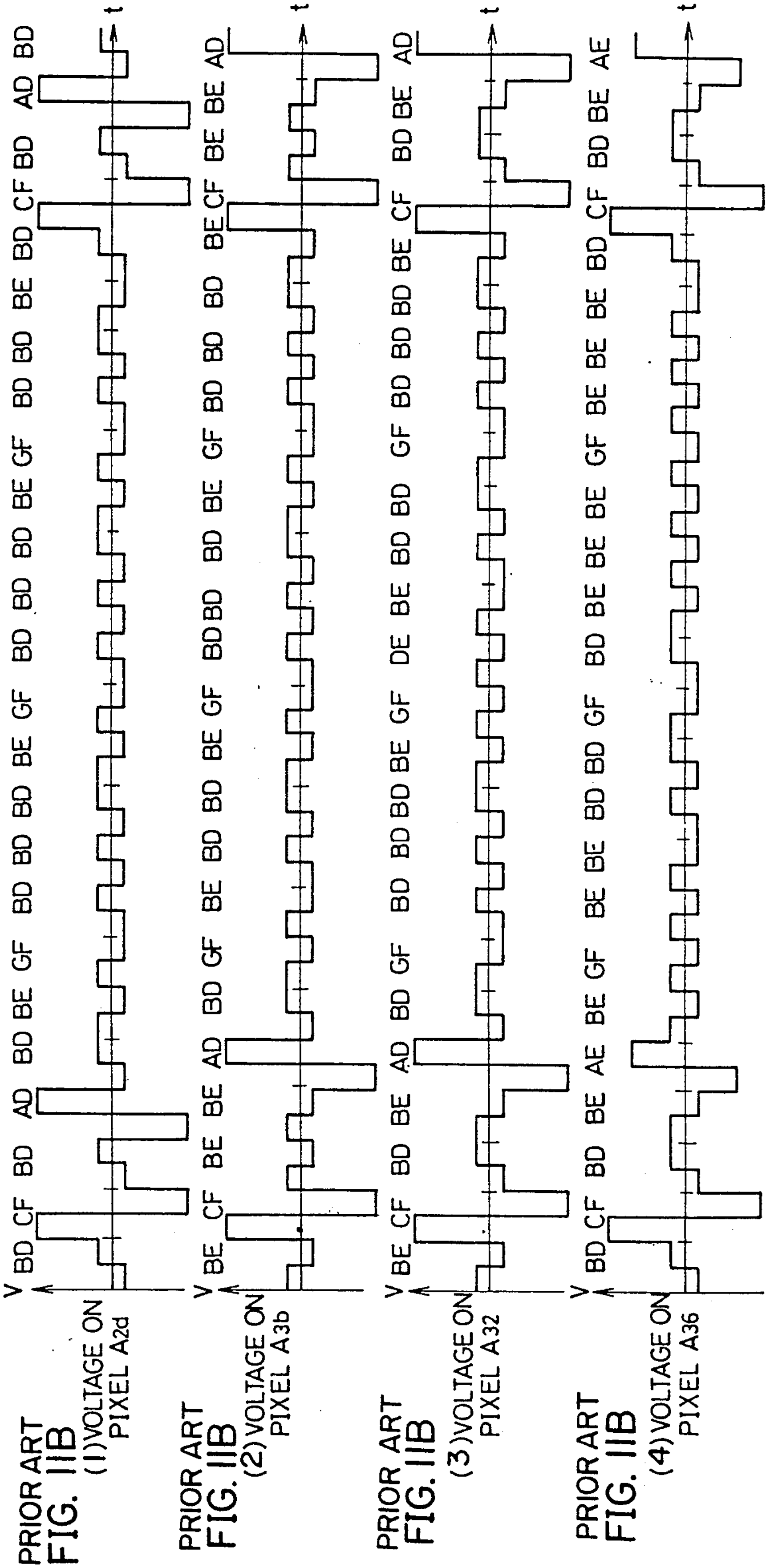
PRIOR ART FIG. 11B (1) VOLTAGE ON PIXEL A2d
PRIOR ART FIG. 11B (2) VOLTAGE ON PIXEL A3b
PRIOR ART FIG. 11B (3) VOLTAGE ON PIXEL A32
PRIOR ART FIG. 11B (4) VOLTAGE ON PIXEL A36

METHOD OF DRIVING FERROELECTRIC LIQUID CRYSTAL WITHOUT TIMING CONVERSION CIRCUITRY

BACKGROUND OF THE INVENTION

1. Field of the Invention

The present invention relates to a method of driving a ferroelectric liquid crystal displaying panel. More specifically, the present invention relates to a method of driving a ferroelectric liquid crystal displaying panel having a plurality of scanning electrodes arranged parallel to each other, signal electrodes arranged parallel to each other intersecting the plurality of scanning electrodes and a ferroelectric liquid crystal sealed between the scanning electrodes and the signal electrodes.

2. Description of the Background Art

FIG. 6 is a cross sectional view of a conventional simple matrix panel with a sealed ferroelectric liquid crystal. Referring to FIG. 6, two deflecting plates (or polarizers) 1 are provided at the top and bottom, arranged in the relation of opposing polarization characteristics with each other. A glass substrate 2 is provided on the deflecting plate 1. Further, on the glass substrate 2 the scanning electrode 3 or the signal electrode 4 is formed. An insulating film 5 is formed over the scanning electrodes 3 and the signal electrodes 4 to protect the ferroelectric liquid crystal 8. An aligning film 6 is provided on the insulating film 5 which is subjected to a process such as rubbing so as to align the molecules of the ferroelectric liquid crystal 8. Sealing member 7 is provided for preventing the ferroelectric crystal liquid in the cell from leaking outward.

FIG. 7 shows the structure of the electrodes in the simple matrix panel sealing ferroelectric crystal liquid shown in FIG. 6. The example shown in FIG. 7 is a simple matrix panel comprising 4 scanning electrodes 3 and 4 signal electrodes 4, which will be referred to as a $4\times4$ simple matrix panel (the former numeral indicating the number of the scanning electrodes 3 and the latter numeral indicating the number of the signal electrodes 4). The scanning electrodes 3 are labeled as $L_1$, $L_2$, $L_3$ and $L_4$ respectively, from the uppermost one, and the signal electrodes are labeled, from the left side, as $S_1$, $S_2$, $S_3$ and $S_4$, respectively. The intersection of the scanning electrode $L_i$ and the signal electrode $S_j$ is represented as a pixel $A_{ij}$ (i and j are positive integers).

FIG. 8 shows a $16\times16$ simple matrix panel displaying a letter "A". FIGS. 9*a*-9*h* are diagrams of voltage waveforms applied to the scanning electrodes when the panel of FIG. 8 is driven. FIGS. 10*a*-10*c* are diagrams of voltage waveforms applied to the signal electrodes 4 for driving the panel shown in FIG. 8. FIGS. 11A (1-4) and 11B (1-4) are diagrams of voltage waveforms applied to the pixels when the panel shown in FIG. 8 is driven.

The operation for driving the panel shown in FIG. 8 in accordance with the conventional method of driving will be described in the following. The voltage shown in FIG. 9*a-h* is applied to each scanning electrode $Li$ by the scanning driver 10(*a-e*), and the voltage shown in FIG. 10 is applied to the signal electrode $S_j$ by the signal driver 9. Then, the voltages such as shown in FIGS. 11A 1-4 and 11B 1-4 are applied to the pixel $A_{ij}$, so that the pixel $A_{ij}$ is set in a bright or dark memory state, thereby displaying the character "A".

The ferroelectric liquid crystal has two memory states, one of which is referred to as the dark memory state while the other is referred to as the bright memory state. In the following, the bright memory state and the dark memory state maybe interchanged. More specifically, as to the scanning electrodes $L_i$, during the time period $-t_0$ to 0, the voltage C (the voltage $V_0$, and then the voltage $-V_0$) is applied to the scanning electrodes $L_1$ to $L_4$ as shown in FIG. 9 (*a*) to (*d*), while the voltage G (voltage $-2V_0/3$, and then the voltage $2V_0/3$) is applied to the scanning electrodes $L_5$ to $L_9$ as shown in FIG. 9 (*e*) to (*h*). During the time period 0 to $t_0$, the voltage A (voltage $-V_0$ and then voltage $V_0$) is applied to the scanning electrode $L_1$ and the voltage B (voltage $2V_0/3$ and then the voltage $-2V_0/3$) is applied to the remaining scanning electrodes.

During the time $t_0$ to $2t_0$, the voltage A is applied to the scanning electrode $L_2$ and the voltage B is applied to the remaining scanning electrodes. During the time period $2t_0$ to $3t_0$, the voltage A is applied to the scanning electrode $L_3$ and the voltage B is applied to the remaining scanning electrodes. During the time period $3t_0$ to $4t_0$, the voltage A is applied to the scanning electrode $L_4$ and the voltage B is applied to the remaining scanning electrodes. Then, during the time $4t_0$ to $5t_0$, the voltage C is applied to the scanning electrodes $L_5$ to $L_8$ and the voltage G is applied to the scanning electrode $L_9$ and $L_1$ to $L_4$. Thereafter, the similar operation is repeated.

As to the signal electrodes $S_j$, during the time period $-t_0$ to 0, the voltage F (voltage $-V_0$ and then voltage $V_0$) is applied to all the signal electrodes $S_j$ as shown in FIG. 10(*a-e*). During the time period 0 to $4t_0$, the voltage D (voltage $V_0$ and then the voltage $-V_0$) or the voltage E (voltage $V_0/3$ and then voltage $-V_0/3$) is applied to each of the signal electrodes $S_j$. During the time period $5t_0$ to $6t_0$, the voltage F is applied to all the signal electrodes $S_j$. Thereafter, the same operation is repeated.

By applying the voltages to the scanning electrodes $L_1$ to $L_4$ and $L_5$ to $L_9$ and to the signal electrodes $S_j$ in the above described manner, the voltages such as shown in FIGS. 11A (1-4) and 11B (1-4) are applied to the pixels $A_{ij}$. More specifically, the voltage applied to the pixel is equal to the voltage applied to the scanning electrode $Li$ minus the voltage applied to the signal electrode $S_j$. For example, the voltage shown in FIG. 11A (a) is applied to the pixel $A_{22}$. Namely, the voltage CF is applied to the pixels $A_{1j}$ to $A_{4j}$ including the pixel $A_{22}$ during the time period $-t_0$ to 0. By this voltage CF, the voltage $2V_0$ and then $-2V_0$ are applied to the pixels including the pixel $A_{22}$, which are set in the dark memory state.

The ferroelectric liquid crystal sealed in this panel has a nature to be set in the dark memory state when the voltage $-2V_0$ is applied for $t_0/2$. When the voltage A is supplied to the scanning electrode $L_2$ and the voltage E is applied to the signal electrode $S_2$ during the time period $t_0$ to $2t_0$, then the voltage AE is applied to the pixel $A_{22}$, keeping the dark memory state. The ferroelectric liquid crystal sealed in this panel has a nature that it is not set to the bright memory state even if the voltage $4V_0/3$ is applied for $t_0/2$. The voltage shown in FIG. 11A (d) is applied to the pixel $A_{2c}$. Namely, the voltage CF is applied to the pixels $A_{1a}$ to $A_{4j}$ including the pixel $A_{2c}$ during the time $t_0$ to 0. For application of voltage CF, the voltage $2V_0$ and then $-2V_0$ are applied to the pixels including the pixel $A_{2c}$, so that these pixels are set to the dark memory state. If the voltage A is applied to the scanning electrode $L_2$ and the voltage D is applied to the signal electrode $S_c$ during $t_0$ to $2t_0$, then the voltage AD is applied, so that the bright memory state is realized. The ferroelectric liquid crystal introduced in this panel has a nature that it is set to the bright memory state when the voltage $2V_0$ is applied for $t_0/2$.

The pixels $A_{22}$ and $A_{2c}$ rewritten in this manner are kept in the bright or dark memory state until the voltage CF is applied the next time as shown in FIG. 11A (1) and (4).

Since the example shown in FIG. 8 is a 16×16 simple matrix panel, the erasing voltage C and the non-selection voltage G are applied to a set of scanning electrodes 3, each set including 4 scanning electrodes 3. Generally, the erasing voltage C and the non-selection voltage G are applied to a set of scanning electrodes 3, each set including 2 to 16 electrodes. When we represent the minimum panel time width necessary for rewriting the memory state of a ferroelectric liquid crystal with a certain applied voltage as $t_m$ (sec), then the time $T_a$ necessary for rewriting all pixels in the M×N simple matrix panel will be as follows, when the erasing voltage C and the non-selection voltage G are applied to a set of scanning electrodes 3 including 16 electrodes.

With a minimum integer K satisfying the condition of $$K \geq M \div 16 \quad (1)$$

the time Ta will be $$T_a = (M+K) \times 2\ t_m \text{ (sec)} \quad (2)$$

Assuming that M is a multiple of 16, then, $$T_a = (17M \div 16) \times 2t_m \text{ (sec)} \quad (3)$$

Consequently, the scanning time per 1 scanning electrode provided by dividing the above value by the number of scanning electrodes m is about $2.1 \times t_m$ (sec).

FIG. 12 is a block diagram for the display of output signal of a conventional personal computer. FIG. 13 is a diagram of waveforms showing the output signal of the personal computer and the input signal of the signal driver shown in FIG. 12.

By using the above described method of driving, the scanning time per scanning electrode can be made considerably close to $2t_m$ (sec). However, a timing converting circuit 12 must be provided between the personal computer 11 and the control circuit 13 shown in FIG. 12. The reason for this is that although the output signal from the personal computer 11 is transmitted to the scanning electrodes $L_1$, $L_2$, $L_3$, $L_4$, $L_5$, $L_6$ and so on as shown in FIG. 13 (*a*), the actual signal to be applied to the signal driver 9 must include a signal corresponding to the timing of applying the voltage F to the signal electrode $S_j$ as shown in FIG. 13 (*b*). Therefore, the timing of the output signals of the personal computer 11 must be converted, so that they can be applied to the signal driver 9.

SUMMARY OF THE INVENTION

Therefore, one object of the present invention is to provide a method of driving a ferroelectric liquid crystal displaying panel in a relatively simple manner without providing a timing converting circuit.

Briefly stated, in the present invention, the liquid crystal displaying panel comprises a plurality of scanning electrodes arranged parallel to each other, signal electrodes arranged parallel to each other intersecting the plurality of scanning electrodes, and a liquid crystal sealed between the plurality of scanning electrodes and the plurality of signal electrodes. A compensation voltage G is applied followed by a succeeding erasing voltage H to the scanning electrode $L_i$ (i being positive integer) corresponding to a pixel to be displayed out of the plurality of scanning electrodes, and thereafter a selecting voltage A is applied thereto, a bright voltage D is applied to a signal electrode corresponding to the pixel to be displayed, so that the corresponding pixel is turned on.

Therefore, in accordance with the present invention, the scanning time $t_0$ per scanning electrode can be set to be twice the pulse width $t_m$ necessary for rewriting the memory state of the ferroelectric liquid crystal without providing the timing converting circuit as in the prior art.

In accordance with a preferred embodiment of the present invention, the compensation voltage G is a voltage which becomes negative for a prescribed time period. The succeeding erasing voltage H is a voltage which becomes positive for a prescribed time period. The selection voltage A is, in a former half of the predetermined time period, a negative voltage which is approximately equal to the succeeding erasing voltage H and, in the latter half of the period, a positive voltage which is approximately equal to the compensation voltage G. The bright voltage D is, in the former half of the predetermined period, a positive voltage which is approximately the same as the selection voltage A in the latter half of the period, and in the latter half of the period, it is selected to be a negative voltage which is approximately equal to the selection voltage A in the former half of the period.

In a further preferred embodiment, a dark voltage E is applied to the signal electrode corresponding to the pixel to be displayed, so that the corresponding pixel is set in the off state. The dark voltage E is selected to be, in the former half of the prescribed period, a positive voltage lower than the bright voltage D in the former half of the period. Further, in the latter half, it is selected to be a negative voltage higher than the bright voltage D.

In a further preferred embodiment, the non-selection voltage B is applied to the scanning electrodes corresponding to the pixels which are not to be displayed, so that these pixels are set to the non-selected state. The non-selection voltage B is selected to be, in the former half in the predetermined time period, a positive voltage lower than the selection voltage A in the latter half and higher than the dark voltage E in the former half, and in the latter half of the period, a negative voltage higher than the selection voltage A in the former half and lower than the dark voltage E in the latter half.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1*a*–*f* are diagrams of voltage waveforms illustrating the principle of the present invention;

FIGS. 5A(1–4) and 5B(1–4) are diagrams of voltage waveforms applied to pixels in driving the liquid crystal display panel shown in FIG. 8;

FIGS. 9*a–h* are diagrams of voltage waveforms applied to the scanning electrodes when the liquid crystal display panel shown in FIG. 8 is driven in a conventional manner;

FIGS. 11A(1–4) and 11B(1–4) are diagrams of voltage waveforms applied to the pixels when the panel shown in FIG. 8 is driven in the conventional manner;

DESCRIPTION OF THE PREFERRED EMBODIMENTS

Figure 2:
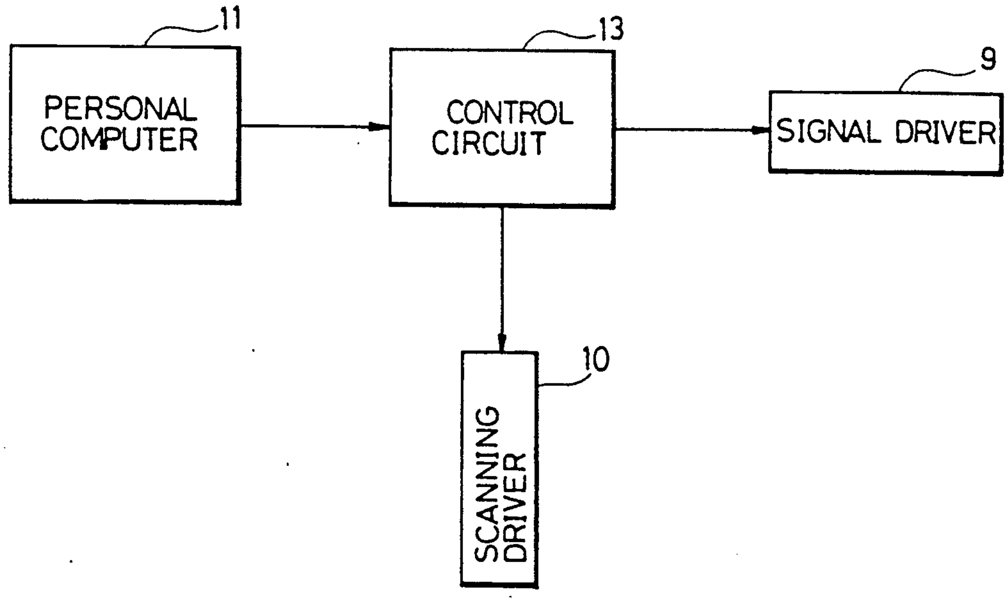
FIG. 2 is a schematic block diagram of one embodiment of the present invention.

FIGS. 1*a–f* are diagrams of waveforms illustrating the principle of the present invention. Referring to FIGS. 1*a–f*, the principle of the present invention will be described. Before the selection voltage A is applied to the scanning electrode $L_i$ (i is a positive integer), the compensation voltage G is applied followed by the succeeding erasing voltage H. More specifically, from the time 0 to $t_0$, a selection voltage A having the waveform as shown in FIG. 1 (*a*), that is, $-V_a$ in the former half of a predetermined time period and Va in the latter half of the period, is applied to the scanning electrode $L_i$. A non-selection voltage B having such a waveform as shown in FIG. 1 (*b*), that is, the voltage $V_b$ in the former half of the period and $-V_b$ in the latter half of the period, or a compensation voltage G having such waveform as shown in FIG. 1(*c*), that is, $V_g$ in the predetermined period, or a succeeding erasing voltage H having such a waveform as shown in FIG. 1 (*d*), that is, $-V_g$ in the prescribed time period, is applied to other scanning electrodes $L_k$ ($k \neq i$).

When a bright voltage D having the waveform as shown in FIG. 1 (*e*), that is, $V_d$ in the former half of the period and $-V_d$ in latter half of the period is applied to the signal electrode $S_j$, then the pixel $A_{ij}$ corresponding to the scanning electrode $L_i$ is set to the bright memory state. When the dark voltage E having the waveform of FIG. 1(*f*), that is, $V_e$ in the former half of the period and $-V_e$ and in the latter half of the period is applied, then the memory state of the pixel $A_{ij}$ corresponding to the scanning electrode $L_i$ is kept as it is.

At the time $P \times t_0$ ($P = 1, 2 \ldots$) before the application of the selection voltage A, the succeeding erasing voltage H is applied to the scanning electrode $L_i$. When the bright voltage D is applied to the signal electrode $S_j$ at this time, then the voltage $-V_g - V_d$ is applied in the former half of the period and the voltage $-V_g + V_d$ is applied in the latter half of the period to the pixel $A_{ij}$, as shown in FIG. 1 (*d*) (1). If the dark voltage E shown in FIG. 1 (*f*) is applied to the signal electrode $S_j$ at this time, then the voltage $-V_g - V_e$ is applied in the former half of the period and the voltage $-V_g + V_e$ is applied in the latter half of the period to the pixel $A_{ij}$ as shown in FIG. 1 (*d*)(2). Therefore, by determining the value of the voltage $V_g$ such that $-V_g + V_d \leqq 0$ and $-V_g + V_e \leqq 0$, then the pixel $A_{ij}$ can be kept in the dark memory state, since it is approximately the same as the application of the voltage $-V_g$ for the time $P \times t_0$ to the pixel $A_{ij}$ no matter whether the bright voltage D is applied or the dark voltage E is applied to the signal electrode $S_j$.

In addition, at the time $Q \times t_0$ ($Q = 1, 2 \ldots$) before the application of the succeeding erasing voltage H to the scanning electrode $L_i$, the compensation voltage G is applied. If the bright voltage D is applied to the signal electrode $S_j$ at this time, then, the voltage $V_g - V_d$ is applied followed by the voltage $V_g + V_d$ to the pixel $A_{ij}$ as shown in FIG. 1(*c*)(1).

When the dark voltage E is applied to the signal electrode $S_j$ at this time, then the voltage $V_g - V_e$ is applied followed by the voltage $V_g + V_e$ to the pixel $A_{ij}$ as shown in FIG. 1(*c*) (2). Namely, no matter whether the bright voltage D is applied or the dark voltage E is applied to the electrode $S_j$, an average voltage of $-V_g$ is applied for the time $Q \times d_0$ to the pixel $A_{ij}$. Therefore, by applying the succeeding erasing voltage H to the signal electrode $S_j$ and by applying the compensation voltage G to the signal electrode Sj, the voltage time product $V_g \times P \times D_0$ applied to the pixel $A_{ij}$ is cancelled, realizing driving with no DC component left therein.

The voltage $-V_a$ is applied in the former half and the voltage $V_a$ is applied in the latter half as the selection voltage A. The voltage $V_b$ is applied in the former half and the voltage - $V_b$ is applied in the latter half as the non-selection voltage B. The voltage $V_g$ is applied as the compensation voltage G and the voltage $-V_g$ is applied as the succeeding erasing voltage H. The voltage $V_d$ is applied in the former half and the voltage $-V_d$ is applied in the latter half as the bright voltage D. The voltage $V_e$ is applied in the former half and the voltage $-V_e$ is applied in the latter half as the dark voltage E. However, the same effect can be obtained provided that the same voltage waveform is applied to the pixel $A_{ij}$, even if the voltage $V_z$ or the like is commonly added to the respective voltages.

FIG. 2 is a block diagram showing one preferred embodiment of the present invention. In this embodiment, provided are a personal computer 11, a control circuit 13, a signal driver 9 and a scanning driver 10. The timing converting circuit 12 shown in FIG. 11 is omitted. In this embodiment also, the simple matrix panel shown in FIG. 8 is driven.

Figure 8:
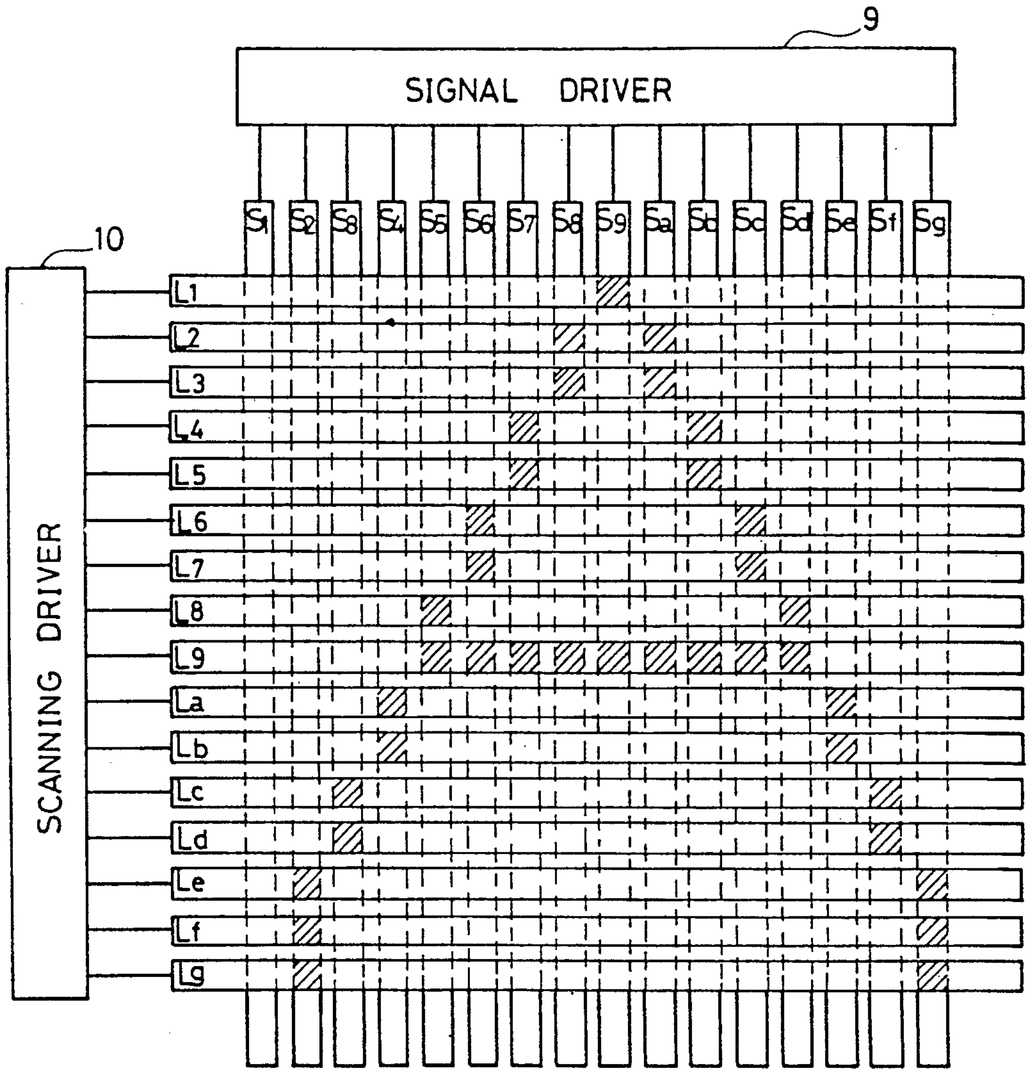
FIG.8 PRIOR ART
FIG. 8 shows an example of a display of a letter "A" on a 16×16 matrix panel.
Figure 10:
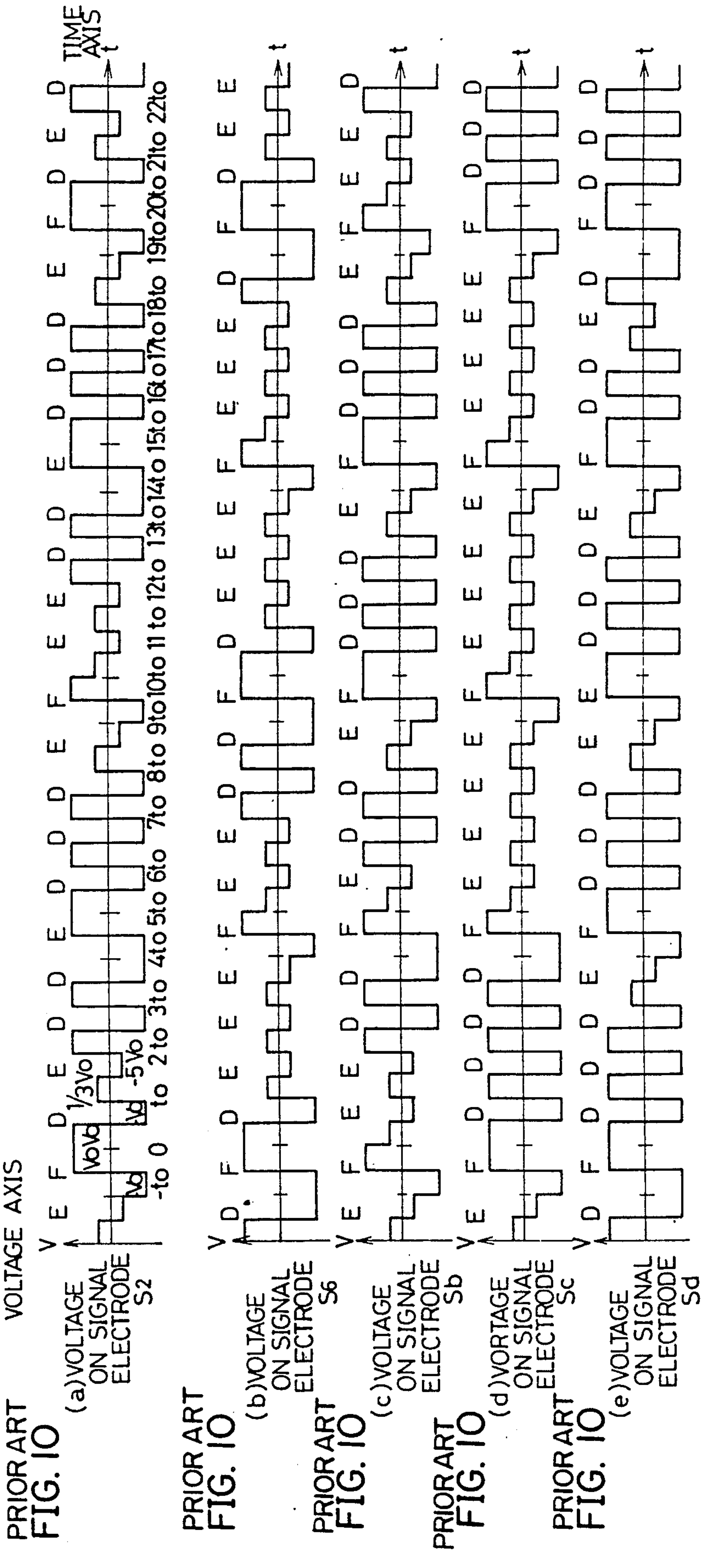
FIGS. 10-*a–e* are diagrams of voltage waveforms applied to the signal electrodes when the liquid crystal display panel of FIG. 8 is driven in the conventional manner.
Figure 12:
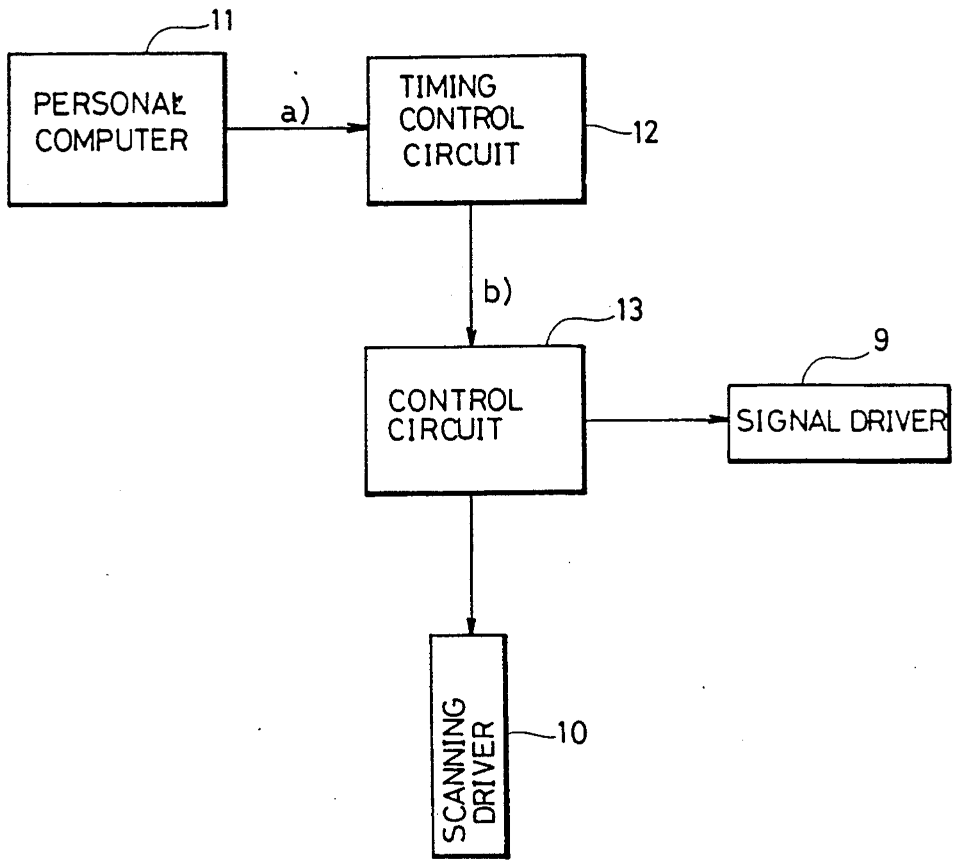
FIG. 12 PRIOR ART
FIG. 12 is a schematic block diagram of a conventional apparatus for displaying output signals from a personal computer.
Figure 13:
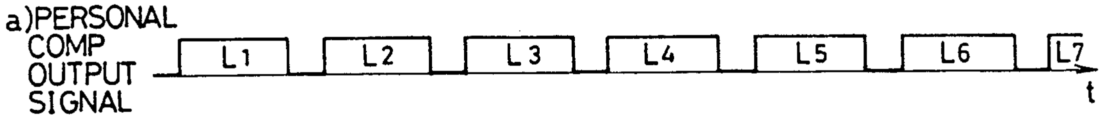
PRIOR ART FIG. 13
FIGS. 13*a–b* show output signals from the personal computer and the input signals of the signal driver shown in FIG. 12.
Figure 13:
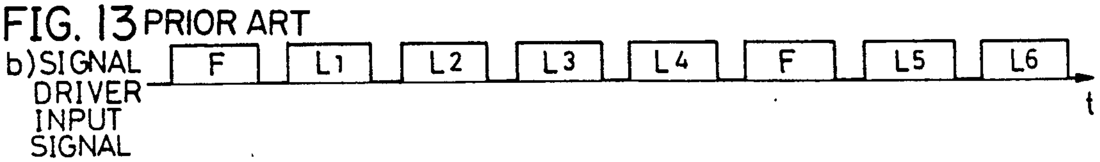
FIG. 13 PRIOR ART

FIGS. 3*a–d* are diagrams of voltage waveforms applied to the scanning electrodes when the panel shown in FIG. 8 is driven. FIGS. 4*a–c* are diagrams of voltage waveforms applied to the signal electrodes. FIGS. 5A and 5B are diagrams of voltage waveforms applied to the pixels.

Figure 3:
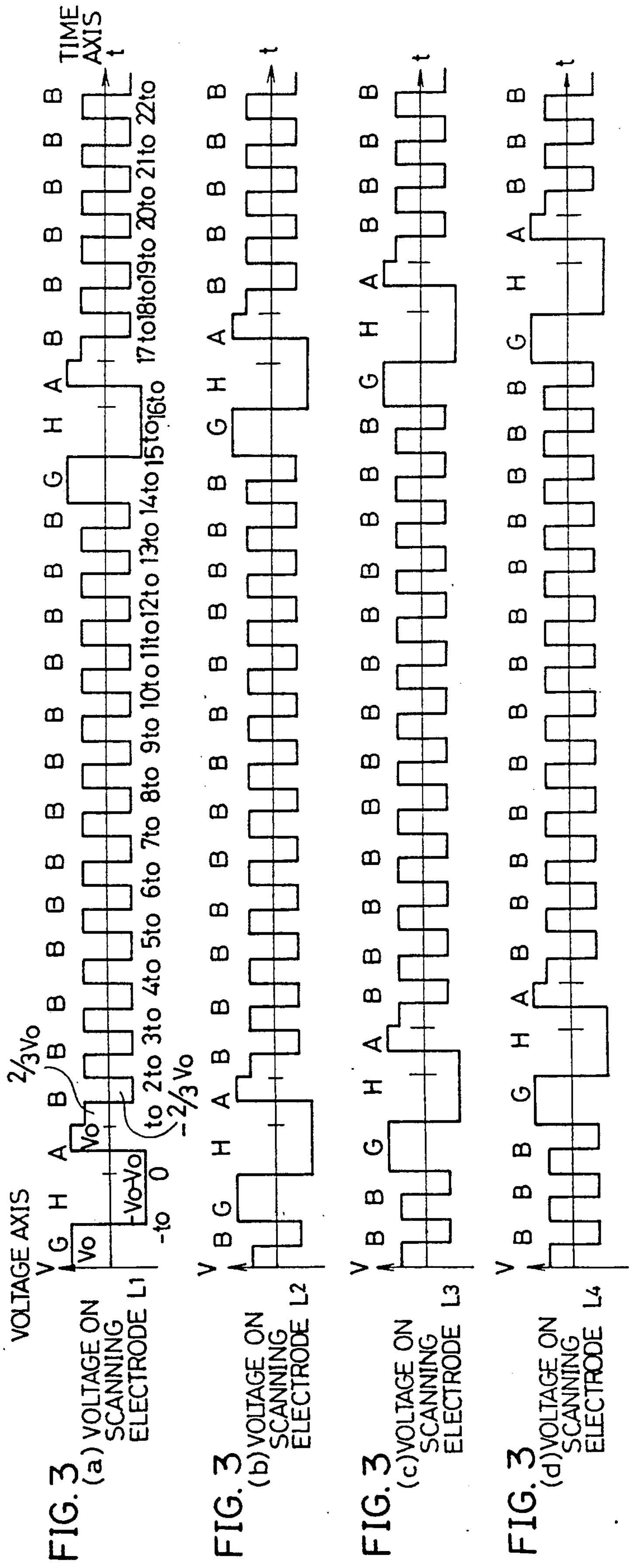
FIGS. 3*a–d* are diagrams of voltage waveforms applied to scanning electrodes in driving the liquid crystal display panel shown in FIG. 8.

A driving method of one embodiment of the present invention will be described in the following. As shown in FIG. 3 (*a*) to (*d*), from the time 0 to $t_0$, the selection voltage A (voltage $-V_0$ and then voltage $V_0$) is applied to the scanning electrode $L_1$; the succeeding erasing voltage H (voltage $-V_0$) is applied to the scanning electrode $L_2$; the compensation voltage G (voltage $V_0$) is applied to the scanning electrode $L_3$; and the non-selection voltage B voltage $2V_0/3$ and then voltage $-2V_0/3$) is applied to the scanning electrodes $L_4$ to $L_9$. Then, from the time $t_0$ to $2t_0$, the selection voltage A is applied to the scanning electrode $L_2$; the succeeding erasing voltage H is applied to the scanning electrode 3; the compensation voltage G is applied to the scanning electrode 4; and the non-selection voltage B is applied to the scanning electrodes $L_5$ to $L_9$ and to $L_1$.

While the scanning electrodes $L_1$ to $L_9$ are scanned in this manner, the dark voltage E (voltage $V_0/3$ and then voltage $-V_0/3$) or the bright voltage D (voltage $V_0$ and then voltage $-V_0$) is applied to the signal electrode $S_j$. In order to display the letter "A" as shown in FIG. 8, the voltages shown in FIG. 4 (*a*) to (*e*) are applied to the signal electrodes $S_2$, $S_6$, $S_b$, $S_c$ and $S_d$.

Consequently, the voltages applied to the pixels $A_{22}$, $A_{26}$, $A_{2b}$, $A_{2c}$, $A_{2d}$, $A_{3b}$, $A_{32}$ and $A_{36}$ are as shown in FIG. 5A (1) to (4) and FIG. 5B (1) to (4). The pixel $A_{22}$, for example, is once set to the dark memory state by the difference voltage between the succeeding erasing voltage H and the dark voltage D or the bright voltage E, that is, HD or HE.

The sealed ferroelectric liquid crystal is set to the dark memory state by the difference voltage HD as described with reference to the prior art. Approximately the same effect is provided by the difference voltage HE. In view of the variations of the characteristics of the cells, the succeeding erasing voltage H may be applied twice.

Figure 4:
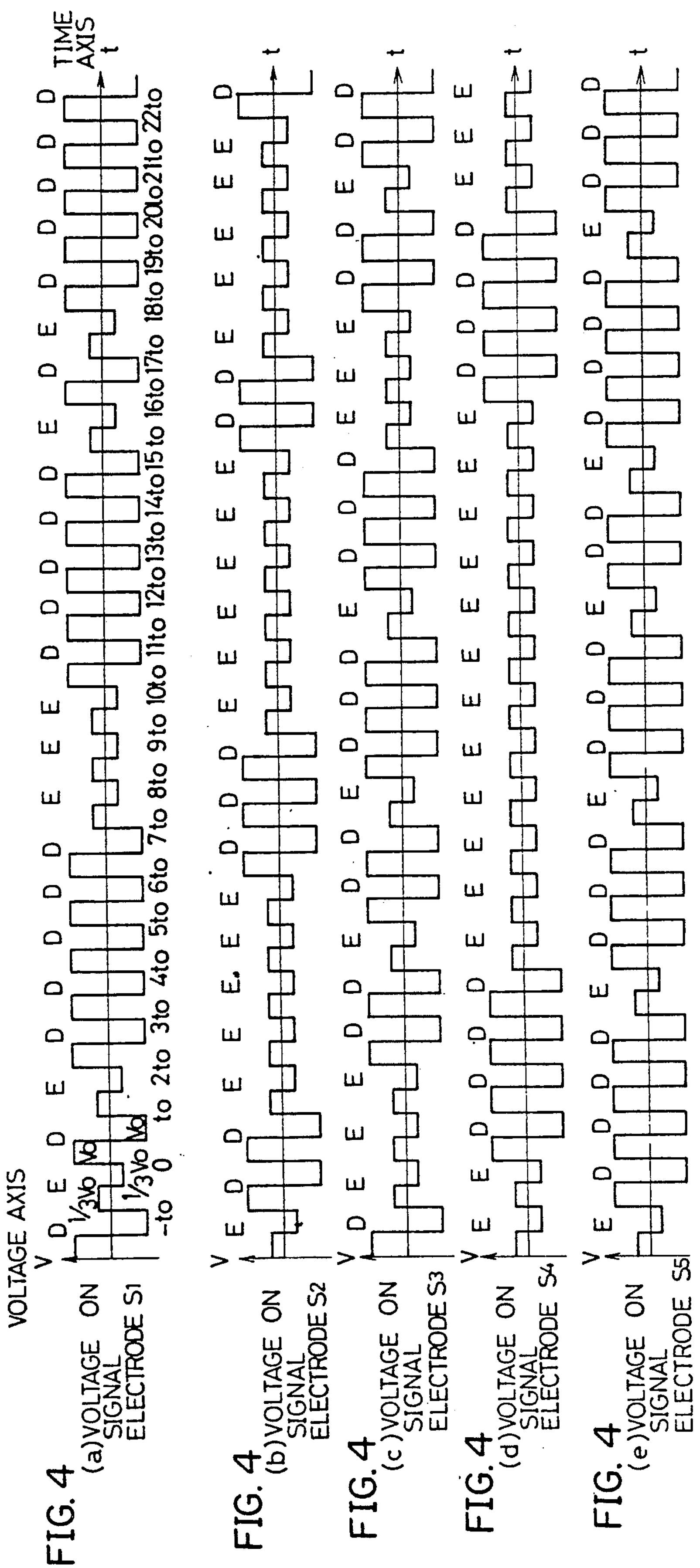
FIGS. 4*a–e* are diagrams of voltage waveforms applied to signal electrodes in driving the panel shown in FIG. 8.
Figure 6:
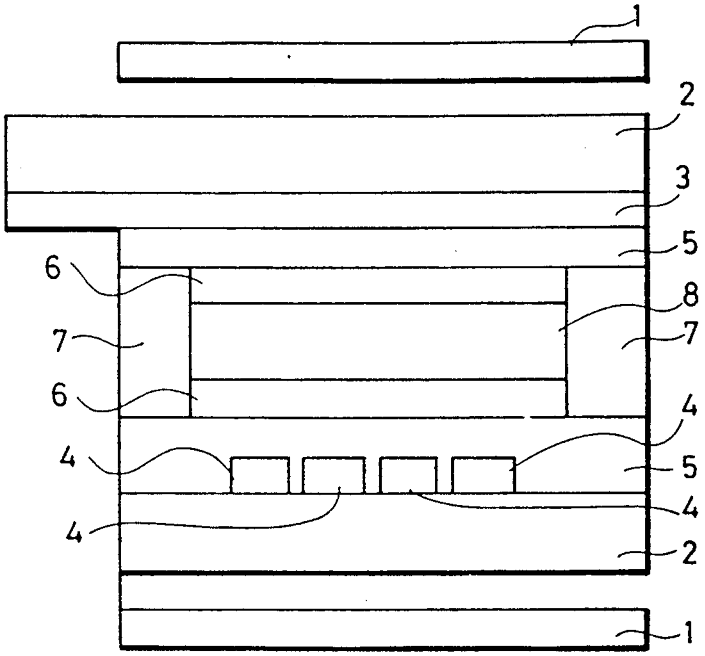
FIG.6 PRIOR ART
FIG. 6 is a cross sectional view of a conventional simple matrix panel sealing ferroelectric liquid crystal.
Figure 7:
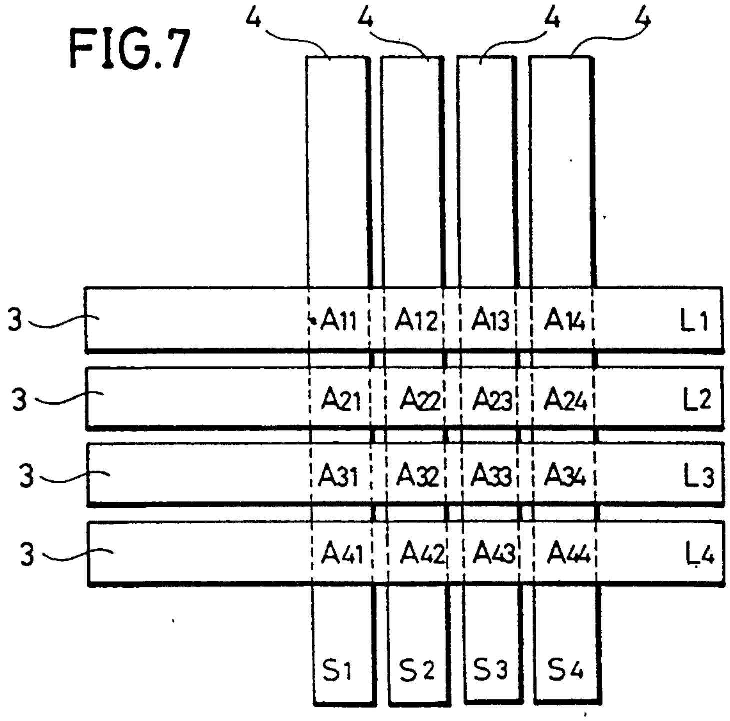
FIG.7 PRIOR ART
FIG. 7 shows an electrode structure of the simple matrix panel sealing the ferroelectric liquid crystal shown in FIG. 6.

The selection voltage A is applied from the time $t_0$ is $2t_0$ to the scanning electrode $L_2$. When the pixel $A_{2j}$ to be set to the dark memory state on this occasion, then the dark voltage E must be applied to the signal electrode $S_j$ as shown in FIG. 4 (*a*) to (*c*).

At this time, the difference voltage AE is applied to the pixel $A_{2j}$ as shown in FIG. 5A (1) to (3). However, the memory state of the pixel $A_{2j}$ is not changed, as shown in the prior art. If the pixel $A_{2j}$ is to be set to the bright memory state, then the bright voltage D must be applied to the signal electrode $S_j$ as shown in FIG. 4 (*d*) and (*e*). On this occasion, the difference voltage AD is applied to the pixel $A_{2j}$ as shown in FIG. 5A (4) and FIG. 5B (1) so that the pixel $A_{2j}$ is changed to the bright memory state. In practice, for example, CS - 1014 produced by CHISSO Corp. is sealed in the simple matrix panel as the ferroelectric liquid crystal and it is driven with $$V_0 = 16\ (V) \quad (4)$$

$$t_0 = 240\ (\mu sec) \quad (5)$$

As described above, in this preferred embodiment of the present invention, a compensation voltage G and then the succeeding erasing voltage H are applied to the scanning electrode $L_1$ before the application of the selection voltage A. Thus, the scanning time $t_0$ (sec) per each scanning electrode can be set twice the time width $t_m$ (sec) of the pulse necessary for rewriting the memory state of the ferroelectric liquid crystal, without providing the timing conversion circuit as in the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of driving a liquid crystal display panel having a plurality of scanning electrodes ($L_i$, i being a positive integer) arranged parallel to each other, signal electrodes ($S_j$, j being a positive integer) arranged parallel to each other intersecting the plurality of scanning electrodes, a plurality of pixels, one formed at each scanning and signal electrode intersection, and a ferroelectric liquid crystal sealed between the plurality of scanning electrodes and the plurality of signal electrodes, comprising the steps of:

applying a compensation voltage G, comprising a voltage which becomes positive for a predetermined time period, followed by a succeeding erasing voltage H, comprising a voltage which becomes negative for said predetermined time period, and thereafter applying a selection voltage A, comprising, in a first half of said predetermined time period, a negative voltage approximately equal to the succeeding erasing voltage H, and comprising in the second half of said predetermined time period, a positive voltage approximately equal to said compensation voltage G, to the scanning electrode $L_i$ corresponding to a pixel to be displayed out of said plurality of pixels; and applying a bright voltage D, comprising in said first half of said predetermined time period, a positive voltage approximately equal to said selection voltage A in the second half of the predetermined time period, and comprising in the second half of the predetermined time period, a negative voltage approximately equal to said selection voltage A in the first half of the predetermined time period, to the signal electrode corresponding to said pixel to be displayed, to thereby turn ON the corresponding pixel.

2. The method of driving a ferroelectric liquid crystal display panel of claim 1, further comprising the steps of:

applying a dark voltage E, comprising in the first half of the predetermined time period, a positive voltage lower in value than the bright voltage D in the first half of the predetermined time period, and comprising in the second half of the predetermined time period, a negative voltage greater in value than said bright voltage D in the second half of the predetermined time period, to the signal electrode corresponding to said pixel to be displayed, to thereby turn OFF the corresponding pixel.

3. The method of driving a ferroelectric liquid crystal display panel of claim 2, further comprising the step of:

applying a non-selection voltage B, comprising, in the first half of the predetermined time period, a positive voltage lower in value than said selection voltage A in the second half of the predetermined time period and higher in value than said dark voltage E in the first half of the predetermined time period, and comprising in the second half of the predetermined time period, a negative voltage higher in value than said selection voltage A in the first half of the predetermined time period and lower in value than the dark voltage E in the second half of the predetermined time period, to the scanning electrodes corresponding to the pixels other than said pixel to be displayed, whereby the pixels other than said pixel to be displayed are set to a non-selected state.

* * * * *